United States Patent
Song et al.

(10) Patent No.: US 11,385,069 B2
(45) Date of Patent: Jul. 12, 2022

(54) OPTICAL NAVIGATION DEVICE AND OPTICAL NAVIGATION METHOD

(71) Applicant: PixArt Imaging Inc., Hsin-Chu (TW)

(72) Inventors: Willie Song, Penang (MY); Zi Hao Tan, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 167 days.

(21) Appl. No.: 16/705,121

(22) Filed: Dec. 5, 2019

(65) Prior Publication Data
US 2021/0172755 A1      Jun. 10, 2021

(51) Int. Cl.
*G01C 21/36*   (2006.01)
*G05D 1/02*    (2020.01)

(52) U.S. Cl.
CPC ..... *G01C 21/3626* (2013.01); *G01C 21/3623* (2013.01); *G05D 1/02* (2013.01)

(58) Field of Classification Search
CPC .. G01C 21/3626; G01C 21/3623; G05D 1/02; G06F 3/033; G06F 3/03543; G06F 3/0304; G06F 3/038
USPC ........................................................ 701/400
See application file for complete search history.

(56) References Cited

U.S. PATENT DOCUMENTS

| | | | |
|---|---|---|---|
| 10,375,321 B2 * | 8/2019 | Yoon | H04N 5/23254 |
| 2007/0183499 A1 * | 8/2007 | Kimata | H04N 19/523 375/240.16 |
| 2009/0195503 A1 * | 8/2009 | Lee | G06F 3/0317 345/166 |
| 2021/0064057 A1 * | 3/2021 | Eldar | G05D 1/0214 |
| 2021/0089413 A1 * | 3/2021 | Su | G06F 11/3075 |

* cited by examiner

*Primary Examiner* — Paula L Schneider
(74) *Attorney, Agent, or Firm* — Winston Hsu

(57) ABSTRACT

An optical navigation system comprising a control circuit and an optical navigation device. The optical navigation device comprises: an image sensor, configured to generate a plurality of image frames; and a motion reporting device, configured to report a first motion of the optical navigation device to the control circuit at a first time after a reference time, and configured to report a second motion to the control circuit at a second time after the first time. The first motion and the second motion are calculated according to the image frames. The control circuit calculates a first scaled motion according to the first motion, the second motion, a first time difference between the first time and the reference time, and a second time difference between the first time and the second time.

20 Claims, 5 Drawing Sheets

OPTICAL NAVIGATION DEVICE AND OPTICAL NAVIGATION METHOD

BACKGROUND OF THE INVENTION

1. Field of the Invention

The present invention relates to an optical navigation device and an optical navigation method, and particularly relates to an optical navigation device and an optical navigation method which can adjust the motion report to have a fixed report size.

2. Description of the Prior Art

An optical navigation device such as an optical mouse always needs to report motions thereof to a host device via a USB device, such that the host device can determine a location of the optical navigation device based on the motions. However, a sensor report rate of the conventional optical navigation device may be asynchronous with a USB report rate thereof. Such situation may cause some problems.

FIG. 1 is a schematic diagram illustrating a conventional motion report operation of an optical navigation device. As illustrated in FIG. 1, an image sensor of the conventional optical navigation device may sense a plurality of image frames SF1-SF7. Also, the USB device of the conventional optical navigation device reports USB reports Ur1, Ur2 and Ur3 to the host every fixed time interval. The USB report may indicate a motion which is calculated based on at least one of the image frames SF1-SF7.

However, since the sensor report rate (e.g. a frame rate of the image sensor) is asynchronous with a USB report rate (i.e. a frequency that the USB device reports motions), each USB report may have different data sizes. That is, the USB report may correspond to data in different time intervals. As shown in FIG. 1, the motion indicated by the USB report Ur1 is 0 since the motion could not be calculated based on only one image frame SF1. Also, the USB report Ur2 indicates motion 1, which is calculated based on image frames SF1, SF2, SF3 and SF4. Further, the USB report Ur3 indicates motion 2, which is calculated based on image frames SF4, SF5 and SF6. Accordingly, the USB reports Ur2 and Ur3 correspond to image frames in different time intervals thus have different report sizes, which may cause some bad user experiences. For example, the user may feel a speed of the icon controlled by the optical navigation device is non-constant since the USB reports Ur2 and Ur3 have different report sizes.

SUMMARY OF THE INVENTION

Therefore, one objective of the present invention is to provide an optical navigation system which can scale motion reports to correspond to a fixed time interval.

Another objective of the present invention is to provide an optical navigation method which can scale motion reports to correspond to a fixed time interval.

One objective of the present invention is to provide an optical navigation system comprising a control circuit and an optical navigation device. The optical navigation device comprises: an image sensor, configured to generate a plurality of image frames; and a motion reporting device, configured to report a first motion of the optical navigation device to the control circuit at a first time after a reference time, and configured to report a second motion to the control circuit at a second time after the first time. The first motion and the second motion are calculated according to the image frames. The control circuit calculates a first scaled motion according to the first motion, the second motion, a first time difference between the first time and the reference time, and a second time difference between the first time and the second time.

Another objective of the present invention is to provide an optical navigation method applied to an optical navigation device. The optical navigation method comprises: (a) generating a plurality of image frames by an image sensor; (b) reporting a first motion of an optical navigation device to a control circuit at a first time after a reference time, and reporting a second motion to the control circuit at a second time after the first time, wherein the first motion and the second motion are calculated according to the image frames; (c) calculating a first scaled motion according to the first motion, the second motion, a first time difference between the first time and the reference time, and a second time difference between the first time and the second time by the control circuit; and (d) determining a location of the optical navigation device according to the first scaled motion.

In view of above-mentioned embodiments, the motion reports can be scaled to correspond to a fixed time interval. Thus the issues for a conventional motion reporting operation can be improved.

These and other objectives of the present invention will no doubt become obvious to those of ordinary skill in the art after reading the following detailed description of the preferred embodiment that is illustrated in the various figures and drawings.

DETAILED DESCRIPTION

In following descriptions, several embodiments are provided to explain the concept of the present invention. Please note, each component or step in following embodiments can be implemented by hardware (e.g. a circuit or a device) or by firmware (e.g. a processor installed with at least one program). Further, each component in following embodiments can be separated to more components or be integrated to fewer components. Besides, the terms "first", "second", "third" in following descriptions are only for defining different components or parameters, but do not mean the sequence thereof.

Figure 1:
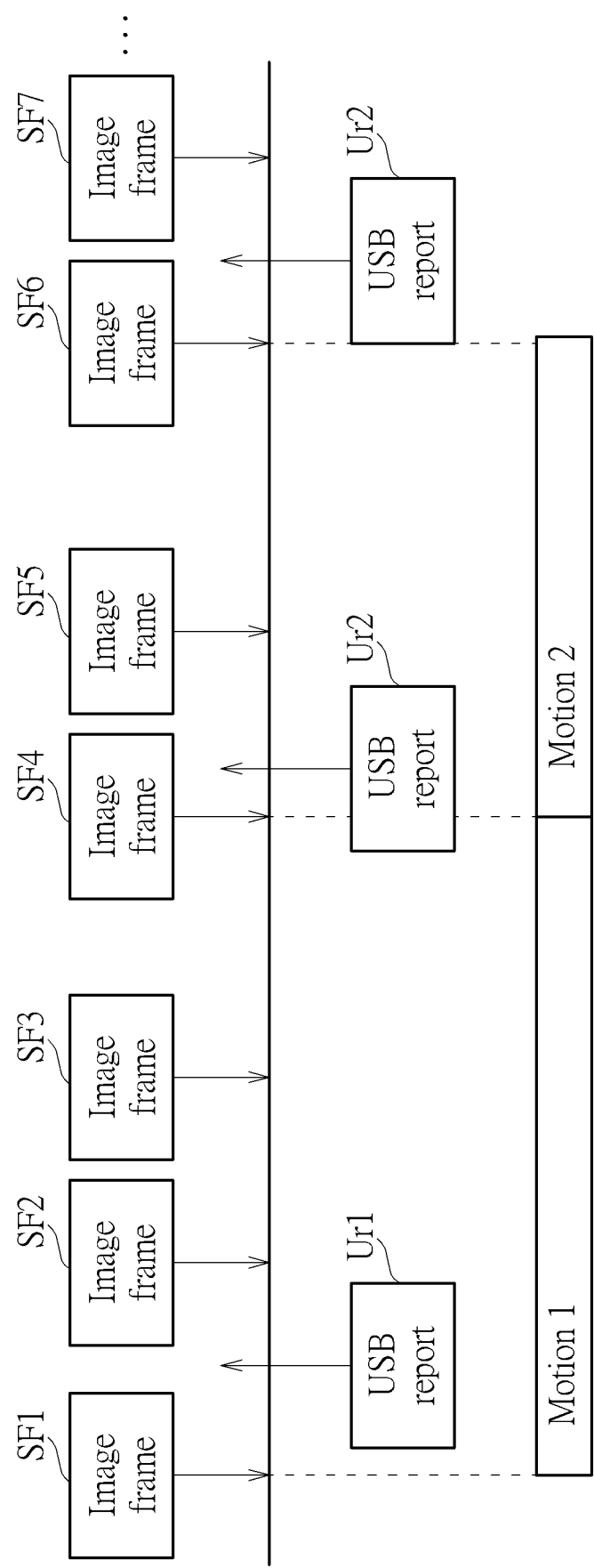
FIG. 1 is a schematic diagram illustrating a conventional motion report operation of an optical navigation device.
Figure 2:
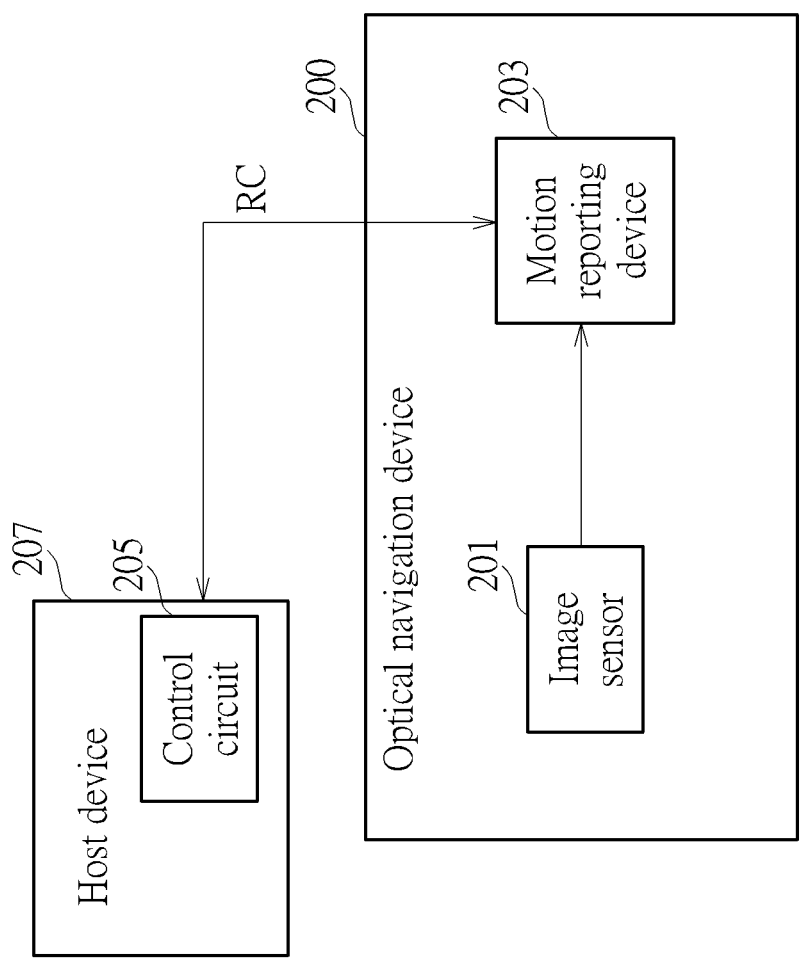
FIG. 2 is a block diagram illustrating an optical navigation device according to one embodiment of the present invention.
Figure 3:
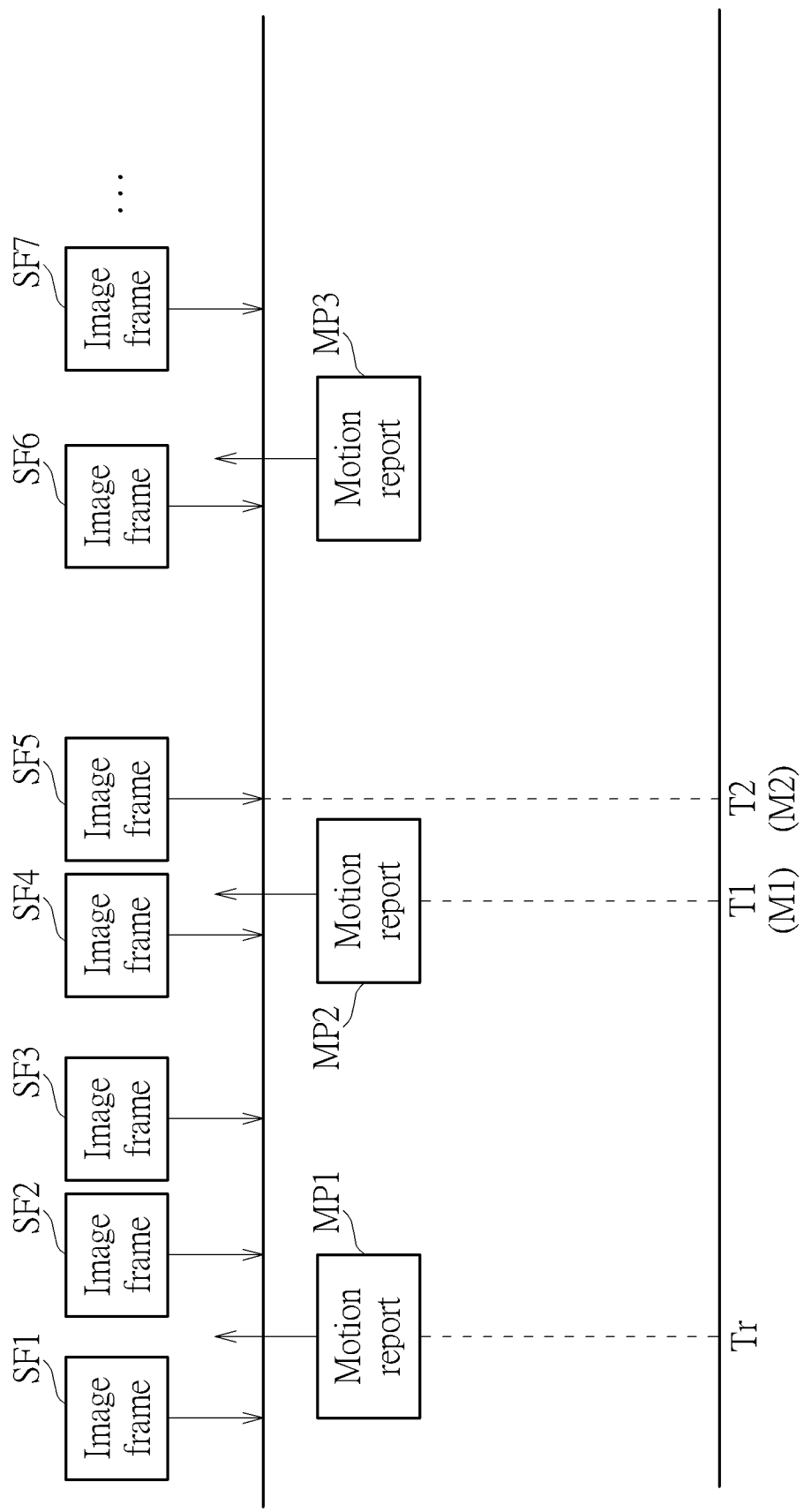
FIG. 3 and FIG. 4 are schematic diagrams illustrating motion report operations of an optical navigation device according to different embodiments of the present invention.
Figure 4:
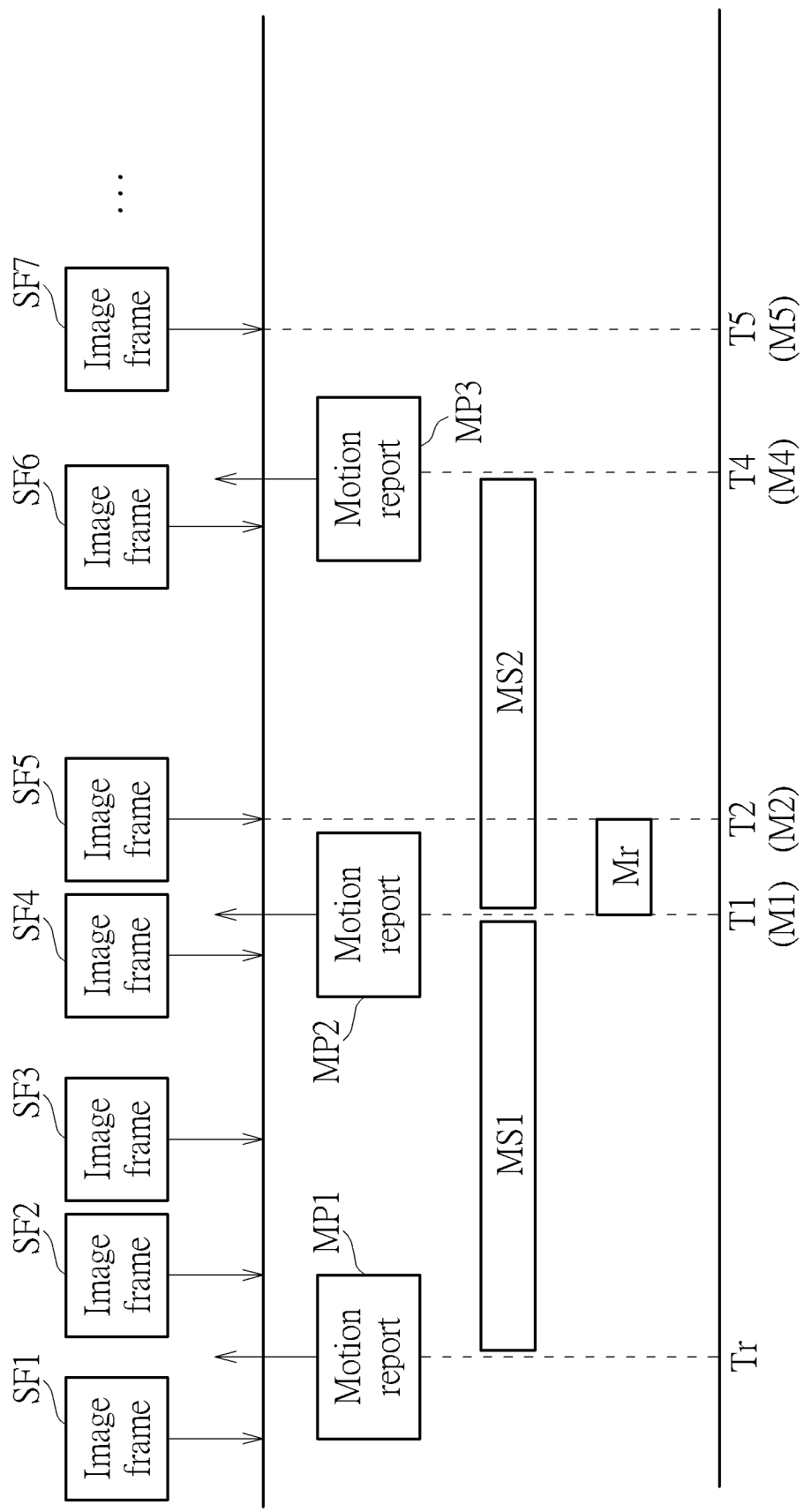

FIG. 2 is a block diagram illustrating an optical navigation device 200 according to one embodiment of the present invention. Besides, FIG. 3 and FIG. 4 are schematic diagrams illustrating motion report operations of the optical navigation device 200 according to different embodiments of the present invention. Please refer to FIG. 2 and FIG. 3 together, and refer to FIG. 2 and FIG. 4 together, to understand the concepts of the present invention for more clarity.

Please first refer to FIG. 2 and FIG. 3 together. As illustrated in FIG. 2, the optical navigation device 200 comprises an image sensor 201 and a motion reporting device 203. The optical navigation device 200 can be an optical mouse, but not limited. The image sensor 201 is configured to generate a plurality of image frames SF1 . . . SF7. The motion reporting device 203, which can be but not limited to a USB device, is configured to report a first motion M1 of the optical navigation device 200 to a control circuit 205 in a host device 207 at a first time T1 after a reference time Tr, and is configured to report a second motion M2 of the optical navigation device 200 to the control circuit 205 at a second time T2 after the first time T1. After that, a first scaled motion MS1 is calculated by the control circuit 205 based on the first motion M1 and the second motion M2. The host device 207 can be a computer which is connected to the optical navigation device wiredly or wirelessly.

The first motion M1 and the second motion M2 are calculated according to at least one of the image frames SF1 . . . SF7. In the embodiment of FIG. 3, the motion M1 is calculated based on image frames SF2-SF4, and the motion M2 is calculated based on image frames SF4-SF5. Further, the first scaled motion MS1 is calculated according to the first motion M1, the second motion M2, a first time difference TD1 between the first time T1 and the reference time Tr, and a second time difference TD2 between the first time T1 and the second time T2. In one embodiment, the first scaled motion MS1 is calculated by an equation of $$(M1 + M2) \times \frac{TD1}{TD1 + TD2},$$

but not limited.

In one embodiment, the second time T2 is after the first time T1 for a predetermined time interval. However, the second time T2 can also be the same as a time that a next sensor report occurs following the first time T1, for example, a time of the image frame SF5 in FIG. 3. In one embodiment, the motion reporting operation at the first time T1 is triggered by the control circuit 205 in the host device 207. Such operation can clear an interrupt generated by a previous sensor report thus the control circuit 205 can know the exact moment when the next sensor report occurs (e.g. a time of the image frame SF_5). Also, in one embodiment, the motion reporting device 203 is triggered by the image sensor 201 to report the second motion M2 at the second time T2. In such case, the image sensor 201 transmits an interrupt to the control circuit 205, and the control circuit 205 reads the second motion M2 corresponding to the interrupt.

Furthermore, in one embodiment, the reference time Tr is a time at which the motion reporting device 200 reports a third motion of the optical navigation device 200 to the host device 207. In the embodiment of FIG. 3, the third motion is 0 since only one image frame exists before the reference time Tr.

Please refer to FIG. 2 and FIG. 4 together. In the embodiment of FIG. 4, the motion reporting device 200 reports a fourth motion M4 of the optical navigation device 200 to the control circuit 205 at a fourth time T4 after the second time T2, and reports a fifth motion M5 of the optical navigation device 200 to the control circuit 205 at a fifth time T5 after the second time T4. After that, a second scaled motion MS2 is calculated by the control circuit 205 based on the fourth motion M4 and the fifth motion M5.

The fourth motion M4 and the fifth motion M5 are calculated according to at least one of the image frames SF1-SF7. Specifically, the fourth motion M4 is calculated based on the image frames SF5, SF6, and the fifth motion M5 is calculated based on the image frames SF6, SF7. The second scaled motion MS2 is calculated according to the fourth motion M4, the fifth motion M5, a third time difference TD3 between the first time T1 and the fourth time T4, a fourth time difference TD4 between the fourth time T4 and the fifth time T5, and a remainder motion Mr calculated by the control circuit 205. The remainder motion Mr is calculated based on a difference between the first scaled motion MS1 and a sum of the first motion M1, the second motion M2. That is, the remainder motion Mr is the motion included in the sum of the first motion M1, the second motion M2 but not included in the first scaled motion MS1. In one embodiment, the second scaled motion MS2 is calculated by an equation of $$(M4 + M5 + Mr) \times \frac{TD3}{TD3 + TD4}.$$

Please refer to FIG. 4 again. The operations of the embodiment illustrated in FIG. 4 can be illustrated as: The motion reporting device 203 reports a first motion M1 at the first time T1 and reports a second motion M2 at the second time T2 to the control circuit 205. After that, the first scaled motion MS1 between the reference time Tr and the first time T1 is acquired by the control circuit 205 based on the above-mentioned steps. Additionally, the motion reporting device 203 reports a fourth motion M4 at the fourth time T4 and reports a fifth motion M5 at the fifth time T5 to the control circuit 205. After that, the second scaled motion MS2 between the first time T1 and the fourth time T4 is acquired based on the above-mentioned steps. If the reference time Tr is a time that the motion reporting device 203 triggered by the control circuit 205 to report a motion, a time interval between the reference time Tr, the first time T1, and a time interval between the first time T1, the fourth time T4 are the same. Accordingly, each motion report MP2, MP3 which respectively indicates the first scaled motion MS1 and the second scaled motion MS2 can have the same report sizes.

Please note, in the above-mentioned embodiments, the first scaled motion M1, the second scaled motion M2 and the remainder motion Mr are calculated by the control circuit 205 in the host device 207. However, the first scaled motion M1, the second scaled motion M2 and the remainder motion Mr can be calculated by a control circuit provided in the optical navigation device 200. In such case, the optical navigation device 200 reports the first motion M1, the second motion M2, the fourth motion M4, the fifth motion M5 to the control circuit located therein.

In such case, the control circuit in the optical navigation device 200 calculates the first motion M1 at the first time T1 and calculates the second motion M2 at the first time T2 in the embodiments of FIG. 3 and FIG. 4. Further, the control circuit in the optical navigation device 200 calculates the first scaled motion MS1 via above-mentioned steps. Also, the control circuit in the optical navigation device 200 calculates the fourth motion M4 at the fourth time T4 and calculates the fifth motion M5 at the fifth time T5 in the embodiment of FIG. 4. Further, the control circuit in the optical navigation device 200 calculates the second scaled motion MS2 via above-mentioned steps. Besides, the optical navigation device 200 reports first scaled motion MS1 and the second scaled motion MS2 to the host device 207 respectively at the second time T2 and the fifth time T5. Therefore, the control circuit in the host device 207 or in the optical navigation device 200 can be regarded as an optical navigation system. Such variations should also fall in the scope of the present invention.

After the scaled motions are acquired, the host device 207 can determine a location of the optical navigation device 200 based on the scaled motions rather than the original first motion M1, the second motion M2, the third motion M3 and the fourth motion M4.

Figure 5:
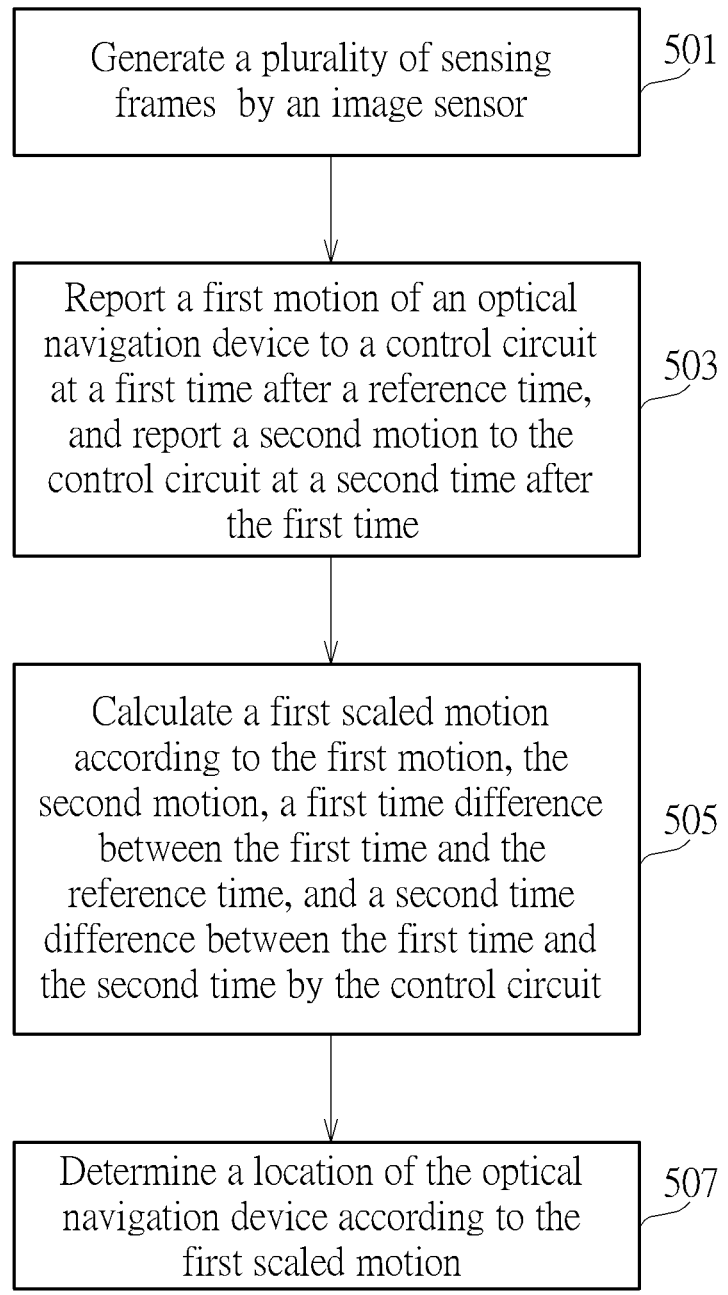
FIG. 5 is a flow chart illustrating an optical navigation method according to one embodiment of the present invention.

In view of above-mentioned embodiments, an optical navigation method applied to an optical navigation device can be acquired. FIG. 5 is a flow chart illustrating an optical navigation method according to one embodiment of the present invention, which comprises:

Step 501

Generate a plurality of image frames (e.g. SF1-SF7 in FIG. 3) by an image sensor.

Step 503

Report a first motion (e.g. M1 in FIG. 3) of an optical navigation device to a control circuit at a first time after a reference time, and report a second motion (e.g. M2 in FIG. 3) to the control circuit at a second time after the first time, wherein the first motion and the second motion are calculated according to the image frames.

Step 505

Calculate a first scaled motion (e.g. MS1 in FIG. 3) according to the first motion, the second motion, a first time difference between the first time and the reference time, and a second time difference between the first time and the second time by the control circuit.

Step 507

Determine a location of the optical navigation device according to the first scaled motion.

Other steps can be acquired in view of above-mentioned disclosure, thus are omitted for brevity here.

In view of above-mentioned embodiments, the motion reports can be scaled to correspond to a fixed time interval. Thus the issues for a conventional motion reporting operation can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation system, comprising:
a control circuit; and
an optical navigation device, comprising:
an image sensor, configured to generate a plurality of image frames; and
a motion reporting circuit, configured to report a first motion of the optical navigation device to the control circuit at a first time after a reference time, and configured to report a second motion to the control circuit at a second time after the first time;
wherein the first motion and the second motion are calculated according to the image frames;
wherein the image sensor generates interrupts to the control circuit and the control circuit acquires the first time and the second time according to the interrupts;
wherein the control circuit calculates a first scaled motion according to the first motion, the second motion, a first time difference between the first time and the reference time, and a second time difference between the first time and the second time;
wherein the control circuit calculates the first scaled motion by an equation of $$(M1+M2) \times \frac{TD1}{TD1+TD2},$$

wherein M1 is the first motion, M2 is the second motion, TD1 is the first time difference and TD2 is the second time difference;
wherein the optical navigation system determines a location of the optical navigation device according to the first scaled motion.

2. The optical navigation system of claim 1, wherein the second time is after the first time for a predetermined time interval.

3. The optical navigation system of claim 1, wherein the second time is a time at which a sensor report occurs following the first time.

4. The optical navigation system of claim 1, wherein the reference time is a time at which the motion reporting circuit receives a report command for reporting a third motion of the optical navigation device.

5. The optical navigation system of claim 1, wherein the control circuit is located in a host device which is connected to the optical navigation device wiredly or wirelessly.

6. The optical navigation system of claim 5, wherein the control circuit triggers the motion reporting circuit to report the first motion at the first time and the image sensor triggers the control circuit to read the second motion at the second time.

7. The optical navigation system of claim 1, wherein the control circuit is located in the optical navigation device.

8. The optical navigation system of claim 1,
wherein the motion reporting circuit reports a fourth motion of the optical navigation device at a fourth time to the control circuit after the second time, and configured to report a fifth motion to the control circuit at a fifth time after the fourth time;
wherein the fourth motion and the fifth motion are calculated according to at least one of the image frames;
wherein the control circuit calculates a second scaled motion is calculated according to the fourth motion, the fifth motion, a third time difference between the first time and the fourth time, a fourth time difference between the fourth time and the fifth time, and a remainder motion;
wherein the remainder motion is calculated based on a difference between the first scaled motion and a sum of the first motion, the second motion.

9. The optical navigation system of claim 8, wherein the control circuit calculates the second scaled motion by an equation of $$(M4+M5+Mr) \times \frac{TD3}{TD3+TD4},$$

wherein M4 is the fourth motion, M5 is the fifth motion, TD3 is the third time difference, TD4 is the fourth time difference and Mr is the remainder motion.

10. The optical navigation system of claim 9, wherein the first scaled motion and the second scaled motion are respectively motions in a fixed time interval.

11. An optical navigation method, applied to an optical navigation device, comprising:
(a) generating a plurality of image frames by an image sensor in the optical navigation device;
(b) reporting a first motion of an optical navigation device to a control circuit at a first time after a reference time by a motion reporting circuit in the optical navigation device, and reporting a second motion to the control circuit at a second time after the first time by the motion reporting circuit, wherein the first motion and the second motion are calculated according to the image frames;
(c) generating interrupts to the control circuit by the image sensor, acquiring the first time and the second time according to the interrupts by the control circuit, calculating a first scaled motion according to the first motion, the second motion, a first time difference between the first time and the reference time, and a second time difference between the first time and the second time by the control circuit; and
(d) determining a location of the optical navigation device according to the first scaled motion by the control circuit;
wherein the control circuit calculates the first scaled motion by an equation of $$(M1+M2) \times \frac{TD1}{TD1+TD2},$$

wherein M1 is the first motion, M2 is the second motion, TD1 is the first time difference and TD2 is the second time difference.

12. The optical navigation method of claim 11, wherein the second time is after the first time for a predetermined time interval.

13. The optical navigation method of claim 11, wherein the second time is a time at which a sensor report occurs following the first time.

14. The optical navigation method of claim 11, wherein the reference time is a time at which the motion reporting circuit receives a report command for reporting a third motion of the optical navigation device.

15. The optical navigation method of claim 11, wherein the control circuit is located in a host device which is connected to the optical navigation device wiredly or wirelessly.

16. The optical navigation method of claim 15, further comprising:
using the control circuit to trigger the motion reporting circuit to report the first motion at the first time;
using the image sensor to trigger the control circuit to read the second motion at the second time.

17. The optical navigation method of claim 11, wherein the control circuit is located in the optical navigation device.

18. The optical navigation method of claim 11, further comprising:
reporting a fourth motion of the optical navigation device at a fourth time to the control circuit after the second time, and reporting a fifth motion to the control circuit at a fifth time after the fourth time, wherein the fourth motion and the fifth motion are calculated according to at least one of the image frames;
calculating a second scaled motion is calculated according to the fourth motion, the fifth motion, a third time difference between the first time and the fourth time, a fourth time difference between the fourth time and the fifth time, and a remainder motion by the control circuit;
wherein the remainder motion is calculated based on a difference between the first scaled motion and a sum of the first motion, the second motion by the control circuit;
wherein the step (c) determines the location of the optical navigation device according to the first scaled motion and the second scaled motion.

19. The optical navigation method of claim 18, wherein the control circuit calculates the second scaled motion by an equation of $$(M4+M5+Mr) \times \frac{TD3}{TD3+TD4},$$

wherein M4 is the fourth motion, M5 is the fifth motion, TD3 is the third time difference, TD4 is the fourth time difference and Mr is the remainder motion.

20. The optical navigation method of claim 18, wherein the first scaled motion and the second scaled motion are respectively motions in a fixed time interval.

* * * * *